United States Patent
Chen et al.

(10) Patent No.: US 6,274,661 B1
(45) Date of Patent: Aug. 14, 2001

(54) CORROSION INHIBITING COMPOSITION FOR POLYACRYLIC ACID BASED BINDERS

(75) Inventors: Liang Chen, New Albany; Arun K. Agrawal, Columbus; Steven H. Williams, Alexandria; Kathryn Lynn Brannon, Pataskala, all of OH (US)

(73) Assignee: Owens Corning Fiberglass Technology, Inc., Summit, IL (US)

( * ) Notice: Subject to any disclaimer, the term of this patent is extended or adjusted under 35 U.S.C. 154(b) by 0 days.

(21) Appl. No.: 09/322,510

(22) Filed: May 28, 1999

Related U.S. Application Data

(60) Provisional application No. 60/087,038, filed on May 28, 1998.

(51) Int. Cl.[7] ...................................... C08K 5/05
(52) U.S. Cl. ..................... 524/388; 524/392; 524/399
(58) Field of Search ................... 524/399, 388, 524/392

(56) References Cited

U.S. PATENT DOCUMENTS

| | | |
|---|---|---|
| 3,374,200 | 3/1968 | Deichert . |
| 3,978,179 | 8/1976 | Sundhauss . |
| 3,992,318 * | 11/1976 | Gaupp ................................. 252/389 |
| 4,317,744 * | 3/1982 | Levi ..................................... 252/389 |
| 4,358,389 * | 11/1982 | Lumer ..................................... 252/70 |
| 4,598,119 | 7/1986 | Volk . |
| 4,936,987 * | 6/1990 | Persinski ............................. 210/699 |
| 5,021,489 * | 6/1991 | Knight ................................. 524/140 |
| 5,294,686 * | 3/1994 | Fiarman ............................... 526/233 |
| 5,318,990 | 6/1994 | Strauss . |
| 5,538,761 | 7/1996 | Taylor . |
| 5,545,348 * | 8/1996 | Savio .................................... 510/230 |
| 5,563,198 * | 10/1996 | Schilling ............................. 524/272 |
| 5,661,213 | 8/1997 | Arkens et al. . |
| 5,670,585 | 9/1997 | Taylor et al. . |
| 5,747,439 * | 5/1998 | Dunn .................................... 510/255 |
| 5,879,436 * | 3/1999 | Kramer ............................. 106/14.42 |
| 6,075,072 * | 6/2000 | Guilbert .............................. 523/200 |

FOREIGN PATENT DOCUMENTS

| | | |
|---|---|---|
| 348695 B1 | 3/1990 | (EP) . |
| 55-140740 | 11/1980 | (JP) . |
| WO 96/04634 | 8/1986 | (WO) . |
| WO 98/13311 | 4/1998 | (WO) . |

* cited by examiner

*Primary Examiner*—Paul R. Michl
(74) *Attorney, Agent, or Firm*—Inger H. Eckert; Stephen W. Barns

(57) ABSTRACT

A fibrous glass binder that reduces corrosion of polycarboxy based binders, such as polyacrylic acid based binders, on carbon steel. The disclosed binder contains corrosion inhibitors such as tin oxalate, tin sulfate, tin chloride and thiourea.

8 Claims, 1 Drawing Sheet

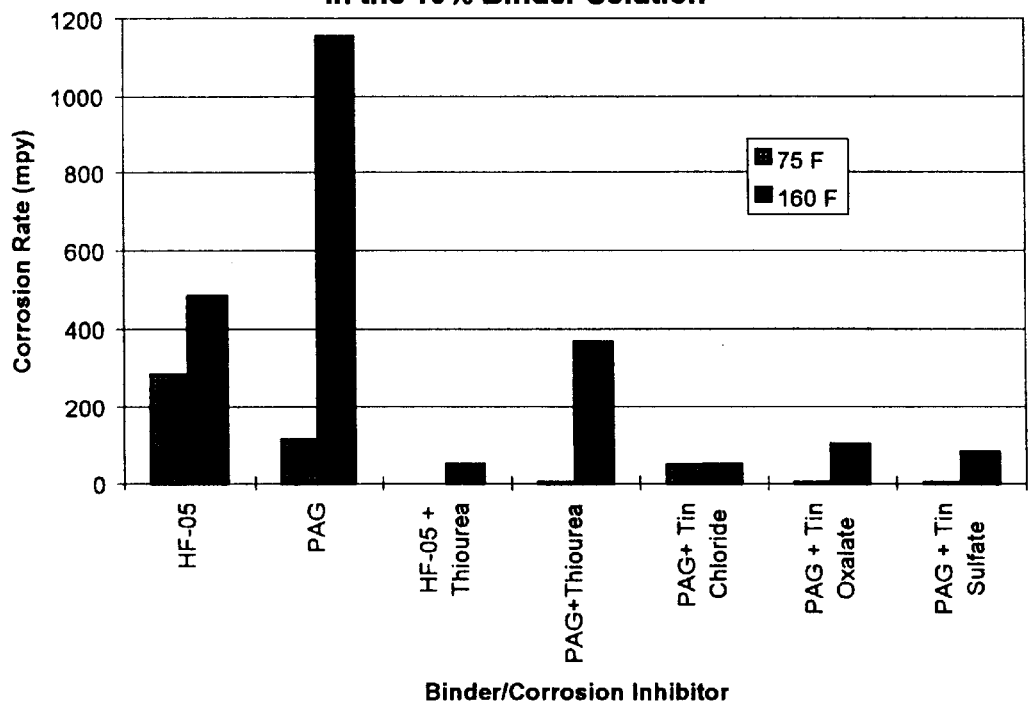

US 6,274,661 B1

CORROSION INHIBITING COMPOSITION FOR POLYACRYLIC ACID BASED BINDERS

CROSS REFERENCE TO RELATED APPLICATION(S)

This application claims the benefit of U.S. provisional application Ser. No. 60/087,038, filed on May 28, 1998, all of which is incorporated by reference as if completely written herein.

TECHNICAL FIELD AND INDUSTRIAL APPLICABILITY OF THE INVENTION

The present invention relates to compositions which effectively reduce and or inhibit the corrosion rate of polycarboxy based binders on metal surfaces such as carbon steel. In particular, the invention provides compositions useful for reducing the corrosion rate of polyacrylic acid based binders on carbon steel. The compositions of the invention also provide a method for protecting production steel hardware and machinery from corrosion while also increasing the length of usage for such machinery. The compositions further allow for increases in line productivity since less repairs are required. The compositions and method of the invention are particularly useful in the glass fiber industry in a wide range of products, for example, range insulation, duct board, pipe, ceiling board and commercial and residential insulation.

BACKGROUND OF THE INVENTION

Glass fiber comes in various forms and can be used for a variety of applications. During the preparation of glass fiber, whether by blown fiber or continuous filament manufacturing process, the resulting glass fibers are easily degraded in their strength characteristics by the self-abrasive motion of one fiber passing over or interacting with another. As a result of this self-abrasion, surface defects are caused in the glass fiber filaments resulting in reductions in overall mechanical strength. Furthermore, glass fiber which is destined for use as building insulation and sound attenuation is often shipped in a compressed form so as to lower shipping costs. When the compressed bundles of glass fiber are utilized at a job site, it is imperative that the glass fiber product recover a substantial amount of its precompressed thickness; otherwise, loss of insulation and sound attenuation properties may result.

Fibrous glass insulation products generally comprise matted glass fiber bonded together by a cured thermoset polymeric material. Molten streams of glass are drawn into fibers of random lengths and blown into a forming chamber where they are randomly deposited as a mat onto a traveling conveyor. The fibers, while in transit in the forming chamber and while still hot from the drawing operation, are sprayed with an aqueous binder. A phenol-formaldehyde binder is currently used throughout the fibrous glass insulation industry. The residual heat from the glass fibers and the flow of air through the fibrous mat during the forming operation are generally sufficient to volatilize a majority of the water from the binder, thereby leaving the remaining components of the binder on the fibers as a viscous or semi-viscous high-solids liquid. The coated fibrous mat, which is formed in a compressed state due to the tremendous flow of air through the mat in the forming chamber, is then transferred out of the forming chamber to a transfer zone where the mat vertically expands due to the resiliency of the glass fibers. This vertical expansion is extremely important to the successful manufacture of commercially acceptable fibrous glass thermal or acoustical insulation products. Thereafter, the coated mat is transferred to a curing oven where heated air is blown through the mat to cure the binder and rigidly bond the glass fibers together.

Phenol-formaldehyde binders have been widely used since they have a low viscosity in the uncured state, yet form a rigid thermoset polymeric matrix for the glass fibers when cured. A low binder viscosity in the uncured state is required to allow the maximum vertical expansion of the coated mat when it exits the forming chamber. A binder which forms a rigid matrix when cured is required so that a finished fibrous glass thermal or acoustical insulation product, when compressed for packaging and shipping, will recover to its as-made vertical dimension when installed in a building.

Traditionally, fiberglass has been treated with phenol/formaldehyde resole binders to alleviate the previously-mentioned defects. The phenol/formaldehyde binder utilized in the past have typically been the highly alkaline resole type which have the combined advantages of inexpensive manufacture and water solubility. As discussed above, the binders are applied to the fiberglass from aqueous solution shortly after the fibers have been produced, and cured at elevated temperature in a curing oven. Under the curing conditions, any remaining aqueous solvent is evaporated, and the phenol/formaldehyde resole cures to a thermoset state. The fibers in the resulting fiberglass product are thus partially coated with a thin layer of thermoset resin, which tends to accumulate at the junctions where fibers cross each other. The resulting product therefore not only suffers from less self-abrasion, but also exhibits higher recovery than a fiberglass product not incorporating a binder.

The alkaline phenol/formaldehyde resoles contain a fairly large excess of formaldehyde from the manufacturing process. This excess of formaldehyde has been taken advantage of by adding urea to the phenol/formaldehyde resole, resulting in a urea-extended resole. Urea-extended phenol/formaldehyde binders are more cost-effective than the straight phenol/formaldehyde resins, but exhibit some loss in properties as the urea content increases. Thus, efforts have been made to incorporate other resins which can enhance the properties of the binder.

Insulation manufacturers have long desired an alternative polymeric binder system for fibrous glass products. However, low molecular weight, low viscosity binders which allow maximum vertical expansion of the mat in the transfer zone generally cure to form a non-rigid plastic matrix in the finished product, thereby reducing the attainable vertical height recovery of the finished insulation product when installed. Conversely, high viscosity binders which generally cure to form a rigid matrix in the finished product do not allow maximum vertical expansion of the coated, uncured mat. Thus it was desirous to prepare a non-phenol/formaldehyde binder having a low viscosity when uncured and structural rigidity when cured. This was solved in U.S. Pat. No. 5,318,990, which is herein incorporated by reference. That patent discloses a fibrous glass binder comprising a polycarboxy polymer, a monomeric trihydric alcohol and a catalyst comprising an alkali metal salt of a phosphorous containing organic acid.

In addition to the obvious improvements gained as a result of the U.S. Pat. No. 5,318,990 binder the industry also found that there were further improvements in terms of reducing emissions evolved during the coating and curing processes. To this end, binder formulations utilizing compounds such as polyacrylic acid have been used. Binders such as that are exemplified in U.S. Pat. Nos. 5,670,585 and 5,538,761, which are herein incorporated by reference.

The use of polyacrylic acid based binders, however, has resulted in severe problems involving high corrosion rates. Thus, there exists a serious need for a method of inhibiting and reducing the corrosion caused by these binder.

SUMMARY OF THE INVENTION

The present invention provides a method and composition that allows for the inhibition and reduction of the corrosive properties of polycarboxy based binders. Prior to the discovery of the present invention, the lifetime of hardware and machinery used with such binders was decreased. In addition productivity levels of manufacturing lines was decreased due to downtime associated with repairs and replacement due to corrosion. As a result of corrosive problems binders with more emissions were used so as to avoid corrosion. However, the present invention allows for the use of the polyacrylic acid based binders, having lower emissions, without the problems associated with corrosion. This results in increases in line productivity as well as reduction in harmful emissions. In some embodiments, the invention reduces harmful end product emissions like cyanate. In addition, the invention may also improve parting strength.

One embodiment of the polyacrylic acid based binder of the invention comprises either thiourea, tin chloride (II), tin sulfate (II), tin oxalate (II) or combinations of the above with a polycarboxy polymer, a monomeric trihydric alcohol, and a catalyst comprising an alkali salt of a phosphorous containing organic acid.

BRIEF DESCRIPTION OF THE DRAWINGS

FIG. 1 is a graph demonstrating corrosion rate versus various binders having corrosion inhibitors.

DETAILED DESCRIPTION AND PREFERRED EMBODIMENTS OF THE INVENTION

The binder according to the present invention comprises an aqueous solution of a polycarboxy polymer, a monomeric trihydric alcohol, a catalyst, a pH adjuster and a corrosion inhibitor. The viscosity of the binder is very low, due to the use of the monomeric trihydric alcohol crosslinking agent, and provides a maximized vertical expansion of the fibrous glass mat as it exits the forming chamber; similar to that vertical expansion provided by the well-known phenolformaldehyde binders. Generally, the use of a monomeric reactant in a low viscosity curable resin results in a weak thermoset structure when cured, however the catalyst of the invention allows the formation of a rigid thermoset when a resin comprising a polycarboxy polymer and a monomeric trihydric alcohol is cured. See U.S. Pat. No. 5,318,990.

The polycarboxy polymer of the present invention comprises an organic polymer or oligomer containing more than one pendant carboxy group. The polycarboxy polymer may be a homopolymer or copolymer prepared from unsaturated carboxylic acids including, but not limited to, acrylic acid, methacrylic acid, crotonic acid, isocrotonic cid, maleic acid, cinnamic acid, 2-methylmaleic acid, itaconic acid, 2-methylitaconic acid, α, β-methyleneglutaric acid, and the like. Alternatively, the polycarboxy polymer may be prepared from unsaturated anhydrides including, but not necessarily limited to, maleic anhydride, itaconic anhydride, acrylic anhydride, methacrylic anhydride, and the like, as well as mixtures thereof. Methods for polymerizing these acids and anhydrides are well-known in the chemical art.

The polycarboxy polymer of the present invention may additionally comprise a copolymer of one or more of the aforementioned unsaturated carboxylic acids or anhydrides and one or more vinyl compounds including, but not necessarily limited to, styrene, α-methylstyrene, acrylonitrile, methacrylonitrile, methyl acrylate, ethyl acrylate, n-butyl acrylate, isobutyl acrylate, methyl methacrylate, n-butyl methacrylate, isobutyl methacrylate, glycidyl methacrylate, vinyl methyl ether, vinyl acetate, and the like. Methods for preparing these copolymers are well-known in the art.

Preferred polycarboxy polymers comprise homopolymers and copolymers of the polyacrylic acid. The preferred polyacrylic acid has a molecular weight ranging from about 100 to about 200,000; more preferrably from about 1,000 to about 10,000 with about 2,000 to about 6,000 being the most preferred. In addition, the preferred polyacrylic acid has free carboxylic acid groups from greater than about 90% with greater than about 95% bring most preferred.

Contemplated equivalent trihydric alcohols according to the present invention having the same operability and utility include, but are not necessarily limited to, glycerol, trimethylolpropane, trimethylolethane, triethanolamine, 1,2, 4-butanetriol, and the like, as well as mixtures thereof. In practice, the monomeric trihydric alcohols of the present invention may be mixed with other polyhydric alcohols for use in the inventive binder composition. Such other polyhydric alcohols include, but are not necessarily limited to, ethylene, glycol, 1,3-propanediol, 1,4-butanediol, 1,60-hexanediol, 2-butene-1, erythritol, pentaerythritol, sorbitol, and the like, as well as mixtures thereof.

Preferred monomeric trihydric alcohols comprise glycerol and trimethylolpropane, as well as mixtures thereof. Examples of preferred trihydric alcohols include triethanolamine and glycerine. In a preferred embodiment the glycerine is obtained from Proctor and Gamble and the triethanolamine is obtained from Ashland Chemical.

The catalyst according to the present invention comprises an alkali metal salt of a phosphorous-containing organic acid; particularly alkali metal salts of phosphorous acid, hypophosphorous acid, and polyphosphoric acids. Examples of such catalysts include, but are not necessarily limited to, sodium, sodium phosphite, potassium phosphite, disodium pyrophosphate, tetrasodium pyrophosphate, sodium tripolyphosphate, sodium hexametaphosphate, potassium phosphate, potassium polymetaphosphate, potassium polyphosphate, potassium tripolyphosphate, sodium trimetaphosphate, and sodium tetrametaphosphate, as well as mixtures thereof.

Preferred catalysts include sodium hypophosphite and sodium phosphite, as well as mixtures thereof. In a preferred embodiment, the catalyst is sodium hypophosphite obtained from Oxychem.

The corrosion inhibiting agent of the invention is selected so as to reduce corrosion of acidic solutions. For example, thiourea and other similar sulfur compounds such as allylthiourea are useful inhibitors. Exemplary inhibitors are compounds such as tin oxalate, tin sulfate, tin chloride and thiourea. In a preferred embodiment, the tin oxalate is obtained from Goldschmidt Industrial Chemicals Corp. Preferably, corrosion inhibiting agents are added in amounts ranging from about 100 to about 100,000 ppm. In a particularly preferred embodiments, the amount ranges from about 1,000 to about 5,000 ppm.

The polycarboxy polymer, monomeric trihydric alcohol, catalyst, and corrosion inhibitor may be mixed with water in any conventional mixing device with agitation. The ratio of polycarboxy polymer to monomeric trihydric alcohol may be determined by comparing the ratio of moles of hydroxyl groups contained in the monomeric trihydric alcohol to the moles of carboxy groups contained in the polycarboxy polymer. This stoichiometric ratio may vary over wide limits from about 0.5 to about 1.5. Preferably, the ratio may vary from about 0.7 to about 1.0. One ordinarily skilled in the art will appreciate that the amount of catalyst used may also vary over wide limits depending upon the temperature at which the binder is cured as well as the time during which the binder is maintained at the elevated curing temperature. Only an amount of a catalyst sufficient to substantially cure the binder (i.e., react together greater than about 75% of the stoichiometrically available carboxy and hydroxyl groups) need be added to the binder mixture. Based upon the combined weight of the polycarboxy polymer, monomeric trihydric alcohol, and catalyst, the amount of catalyst required may vary over wide limits from about 1% to about 15% by weight. Preferably, the amount may vary from about 4% to about 8% by weight. Water may be added to the mixture of polycarboxy polymer, monomeric trihydric alcohol, and catalyst in any amount which would produce an aqueous binder having a viscosity and flow rate suitable for its application to a forming fibrous glass mat by any convenient method, such as by spraying. Conveniently, water may comprise up to about 95% by weight of the binder.

The binders of the present invention may optionally contain conventional adjuvants such as, for example, coupling agents, dyes, oils, fillers, thermal stabilizers, flame retarding agents, lubricants, pH adjusters and the like, in conventional amounts generally not exceeding 20% of the weight of the binder. In particular, pH adjusters such as ammonium hydroxide may be used to raise the pH. The preferred pH for application of the binder is from about 2.5 to about 5 with about 3 to about 4 being the most preferred.

In operation, the inventive binder is applied to glass fibers as they are being produced and formed into a mat, water is volatilized from the binder, and the high-solids binder-coated fibrous glass mat is heated to cure the binder and thereby produce a finished fibrous glass batt which may be used as a thermal or acoustical insulation product, a reinforcement for a subsequently produced composite, etc.

It is generally well-known in the art to produce a porous mat of fibrous glass by fiberizing molten glass and immediately forming a fibrous glass mat on a moving conveyor. Glass is melted in a tank and supplied to a fiber forming device such as a spinner or a bushing. Fibers of glass are attenuated from the device and are blown generally downwardly within a forming chamber. The glass fibers typically have a diameter from about 3 to about 9 microns and have a length from about ¼ inch to about 3 inches. Preferably, the glass fibers range in diameter from about 3.5 to about 7 microns, and have a length from about ½ inch to about 2 inches. The glass fibers are deposited onto a perforated, endless forming conveyor. The binder is applied to the glass fibers as they are being formed by means of suitable spray applicators so as to result in a distribution of the binder throughout the formed mat of fibrous glass. The glass fibers, having the uncured resinous binder adhered thereto, are gathered and formed into a mat on the endless conveyor within the forming chamber with the aid of a vacuum drawn through the mat from below the forming conveyor. The residual heat contained n the glass fibers as well as the air flow through the mat causes a majority of the water to volatilize from the mat before it exits the forming chamber.

As the high-solids resin-coated fibrous glass mat emerges from the forming chamber, it expands vertically due to the resiliency of the glass fibers. The expanded mat is then conveyed to and through a curing oven wherein heated air is passed through the mat to cure the resin. Flights above and below the mat slightly compresses the mat to give the finished product a predetermined thickness and surface finish. Typically, the curing oven is operated at a temperature from about 200° C. to about 350° C. Preferably, the temperature ranges from about 225° to about 300° C. Generally, the mat resides within the oven for a period of time from about ¼ minute to about 3 minutes. For the manufacture of conventional thermal or acoustical insulation products, the time ranges from about ¾ minute to about 2 minutes. The fibrous glass having a cured, rigid binder matrix emerges from the oven in the form of a batt which may be compressed for packaging and shipping and which will thereafter substantially fully recover its as-made vertical dimension when unconstrained. By way of example, a fibrous glass mat which is about 1¼ inches thick as it exits from the forming chamber, will expand to a vertical thickness of about 9 inches in the transfer zone, and will be slightly compressed to a vertical thickness of about 6 inches in the curing oven.

EXAMPLE I

The following binders were prepared with and without inhibitors and applied to fibrous glass as it was formed into a mat.

| Binder A | Polyacrylic Acid (6000 MW) | 69.92% |
| --- | --- | --- |
| | Triethanol amine | 22.94% |
| | Sodium hypophosphite | 4.64% |
| | Ammonia | 2.50% |
| Binder B | CA-4885 (polyacrylic acid - 2000 MW) | 70.55% |
| | Glycerine | 21.43% |
| | Sodium hypophosphite | 5.52% |
| | Ammonia | 2.50% |

The binders were then tested according to Article 15, Part 1120 Combustion Toxicity Testing New York State Uniform Fire Prevention and Building Code by Southwest Research Institute. A 9% LOI sample had a LC50 of 114 gm versus the lower limit of 16 gm. In addition, a polarization resistance measurement technique, similar to that described in ASTM Standard Practice G59, was used to estimate the corrosion rates of the carbon steel coupons which were exposed to the binder solutions in the absence or presence of the inhibiting agents. The results are given in Table I below.

TABLE 1

Corrosion Rate (mpy) Comparison at 750° F. and 160° F.

| Binder/Inibitor | 75 F. | 160 F. | Corrosion Inhibitor PPM |
| --- | --- | --- | --- |
| Binder A | 280 | 480 | — |
| Binder B | 113 | 1152 | — |
| A + Thiourea | <1 | 48 | 1000 |
| B + Thiourea | 2 | 363 | 1000 |
| B + Tin Chloride | 46 | 48 | 5000 |
| B + Tin Oxalate | 1 | 99 | 1000 |
| B + Tin Sulfate | 1 | 80 | 1000 |

In addition to testing for corrosion inhibition, the hydrogen cyanide levels generated in the air stream were also measured to be approximately 1–2 ppm regardless of the amount of sample in the range of from 50 to 150 grams. (The upper limit for compliance is approximately 150 ppm in a 30 minute period.)

When tested, some range insulation products produced using binder B plus either the tin oxalate, tin sulfate or thiourea corrosion inhibitor showed improvements in parting strength ranging from 1.4× to 3× versus a standard.

What is claimed is:

1. A fibrous glass binder, comprising an aqueous solution of:
   a) a polycarboxy polymer comprising a homopolymer or copolymer prepared from an unsaturated carboxylic acid or an anhydride or mixtures thereof;
   b) a monomeric trihydric alcohol;
   c) a catalyst, comprising an alkali metal salt of a phosphorous-containing organic acid; and
   d) a corrosion inhibiting agent.

2. The fibrous glass binder according to claim 1, wherein the polycarboxy polymer comprises homopolymers and copolymers of polyacrylic acid.

3. The fibrous glass binder according to claim 1, wherein the monomeric trihydric alcohol comprises glycerine.

4. The fibrous glass binder according to claim 1, wherein the catalyst is selected from the group consisting essentially of sodium hypophosphite and sodium phosphite, and mixtures thereof.

5. The fibrous glass binder of claim 1, wherein the corrosion inhibiting agent is selected from the group consisting of tin oxalate, tin sulfate, tin chloride and thiourea.

6. A low corrosion process for the preparation of a binder coated glass fiber product comprising:
   a) selecting a polycarboxy polymer, a monomeric trihydric alcohol, and a catalyst, as components of the binder;
   b) mixing said components;
   c) adding to said binder components a corrosion inhibiting agent;
   d) applying the mixture comprising (a) and (c) to glass fibers in need of binder coating in order to form a binder containing glass fiber; and
   e) curing said binder containing glass fibers to form a binder coated glass fiber product.

7. A process for preparation of a binder coated glass fiber product having low cyanate emissions comprising:
   a) selecting a polycarboxy polymer, a monomeric trihydric alcohol, and a catalyst, as components of the binder;
   b) mixing said components;
   c) adding to said binder components a corrosion inhibiting agent selected from the group consisting of tin oxalate, tin sulfate, and tin chloride;
   d) applying the mixture comprising (a) and (c) to glass fibers in need of binder coating in order to form a binder containing glass fiber; and
   e) curing said binder containing glass fibers to form a binder coated glass fiber product.

8. The process of claim 7, wherein said monomeric trihydric alcohol is glycerine.

* * * * *